United States Patent [19]
Reimer et al.

[11] Patent Number: 5,844,651
[45] Date of Patent: Dec. 1, 1998

[54] LIQUID CRYSTAL OPTICAL DEVICE

[75] Inventors: Dirk Reimer; Eriko Matsui, both of Kanagawa; Akio Yasuda, Tokyo; Akiyuki Fukushima, Tokyo; Atsushi Yoshizawa, Tokyo, all of Japan

[73] Assignee: Sony Corporation, Tokyo, Japan

[21] Appl. No.: 728,918

[22] Filed: Oct. 11, 1996

[30]  Foreign Application Priority Data

Oct. 13, 1995 [JP] Japan ................................. 7-291809

[51] Int. Cl.$^6$ ............................. G02F 1/1333; G02F 1/13
[52] U.S. Cl. ........................... 349/134; 349/33; 349/172; 349/184; 252/299.01
[58] Field of Search ....................... 252/299.01; 349/134, 349/171, 172, 184, 33

[56]  References Cited

U.S. PATENT DOCUMENTS 5,417,883   5/1995   Epstein et al. ........................... 349/172

FOREIGN PATENT DOCUMENTS

| 0 548 548 | 6/1993 | European Pat. Off. . |
| 0 571 955 | 12/1993 | European Pat. Off. . |
| 0 637 622 | 2/1995 | European Pat. Off. . |
| 3 916 508 | 11/1990 | Germany . |

OTHER PUBLICATIONS

Y. Takanishi et al., "Spontaneous Formation of Quasi–Bookshelf Layer Structure in New Ferroelectric Liquid Crystals Derived from a Naphthalene Ring", Japanese Journal of Applied Physics, vol. 29, No. 6, Part 2, Tokyo, Japan, pp. L984–L986.

K. Nomura et al., "Electric Field Effect on Layer Structure in Surface–Stabilized Ferroelectric Liquid Crystals", Japanese Journal of Applied Physics, vol. 34, No. 10, Part 1, Oct. 1995, pp. 5689–5693.

N. Shiratori et al., "Effect of Core Structure on Spontaneous Polarization in New Ferroelectric Liquid Crystals with a Fluorinated Chiral Part", Japanese Journal of Applied Physics, vol. 29, No. 11, Part 2, Tokyo, Japan, Nov. 1990, pp. L2086–L2088.

S. Inui et al., "First Order Paraelectric–Antiterroelectric Phase Transition in a Chiral Smectic Liquid Crystal of a Fluorine Containing Phenyl Pyrimidine Derivative", Japanese Journal of Applied Physics, vol. 29, No. 6, Part 2, Tokyo, Japan, pp. L987–L990.

Y. Yamada et al., "Ferroelectric Liquid Crystal Display Using Tristable Switching", Japanese Journal of Applied Physics, vol. 29, No. 9, Part 1, Tokyo, Japan, Sep. 1990, pp. 1757–1764.

*Primary Examiner*—William L. Sikes
*Assistant Examiner*—Julie Ngo
*Attorney, Agent, or Firm*—Hill & Simpson

[57]  ABSTRACT

An object of the present invention is to provide a liquid crystal display device such as an FLC display which is significantly reduced for the temperature dependence of the liquid crystal properties. A liquid crystal optical device 31 in which a plurality of transparent substrates 2a, 2b are opposed to each other at a predetermined gap 32, with transparent electrodes 3a, 3b and liquid crystal alignment films 4a, 4b being disposed, respectively, to the opposing surfaces and ferroelectric liquid crystal (FLC) 30 is disposed in the gap 32, wherein the ferroelectric liquid crystal 30 has a layer texture 30A, and the change of the layer tilt angle is less than 3° within an entire temperature range in the smectic C* phase. An atom group substituted and introduced with a fluorine atom is bonded to a chiral molecular skeleton of a ferro electric liquid crystal molecule, and the atom group substituted and introduced with a fluorine atom has a fluorinated phenylene ring, wherein said liquid crystal material has a uniform texture achieved by applying rectangular electric pulses while slowly cooling from an isotropic phase to a low temperature smectic A phase, followed by application of bipolar electric pulses while cooling to room temperature.

10 Claims, 12 Drawing Sheets

FIG. 1A 258K (−15°C)
Cr PHASE

FIG. 1B 298K (25°C)
SmC* PHASE

FIG. 1C 318K (45°C)
SmC* PHASE

FIG. 1D 325K (52°C)
SmC* PHASE

FIG. 1E

332K (59°C)
SmA PHASE

| | FLC-1 | FLC-2 | FLC-3 | REMARKS |
|---|---|---|---|---|
| C9H19—⟨N=N⟩—⟨O⟩—OC6H13 | 17.1 wt% | 17.1 wt% | 17.1 wt% | NON-CHIRAL COMPOSITION |
| C9H19—⟨N=N⟩—⟨O⟩—OC7H15 | 17.0 wt% | 17.0 wt% | 17.0 wt% | |
| C8H17—⟨N=N⟩—⟨O⟩—OCOC5H11 | 17.1 wt% | 17.1 wt% | 17.1 wt% | |
| C8H17—⟨N=N⟩—⟨O⟩—OCOC6H13 | 17.0 wt% | 17.0 wt% | 17.0 wt% | |
| C9H19—⟨N=N⟩—⟨O⟩—OCOC5H11 | 17.0 wt% | 17.0 wt% | 17.0 wt% | |
| C6H13—⟨O⟩—COO—⟨O,N⟩—OC8H17 | 7.4 wt% | 7.4 wt% | 7.4 wt% | |
| C6H13O—⟨N=N⟩—⟨O⟩—OCOC*HFC5H11 / CH3 | 7.4 wt% | — | — | NO FLUORO SUBSTITUTED |
| C6H13O—⟨N=N⟩(F,F)—⟨O⟩—OCOC*HFC5H11 / CH3 | — | 7.4 wt% | — | FLUORO SUBSTITUTED |
| C10H21O—⟨N=N⟩(F,F)—⟨O⟩—OCOC*HFC5H11 / CH3 | — | — | 7.4 wt% | |
| PHASE TRANSITION TEMPERATURE (°C) | 67.0  63.7  56.7<br>Iso→Ch→SmA→SmC* | 65.8  60.9  58.3<br>Iso→Ch→SmA→SmC* | 64.2  59.3  56.4<br>Iso→Ch→SmA→SmC* | |

PULSE DRIVING (WITH RESET PULSE)

LIQUID CRYSTAL OPTICAL DEVICE

BACKGROUND OF THE INVENTION

1. Field of the Invention

The present invention concerns a liquid crystal optical device (particularly, liquid crystal display device).

2. Description of Related Art

Figure 11:
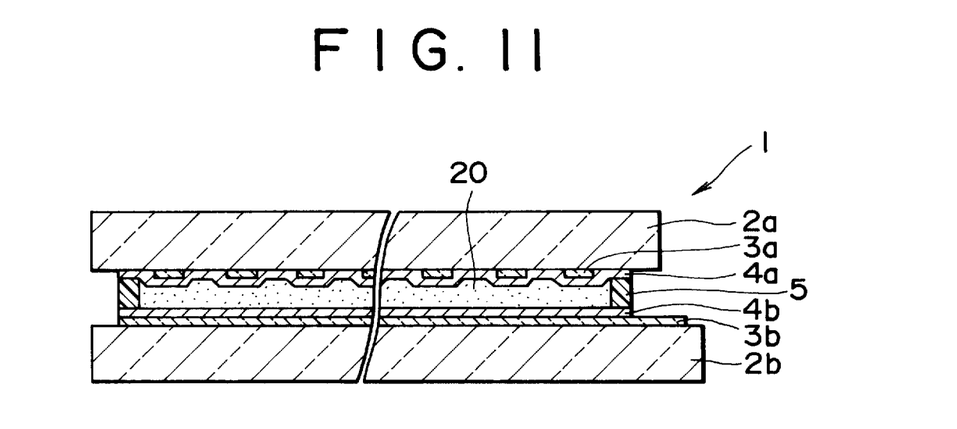
FIG. 11 is a schematic cross sectional view (cross sectional view taken along line XI—XI in FIG. 12) of liquid crystal display device of the prior art.
Figure 12:
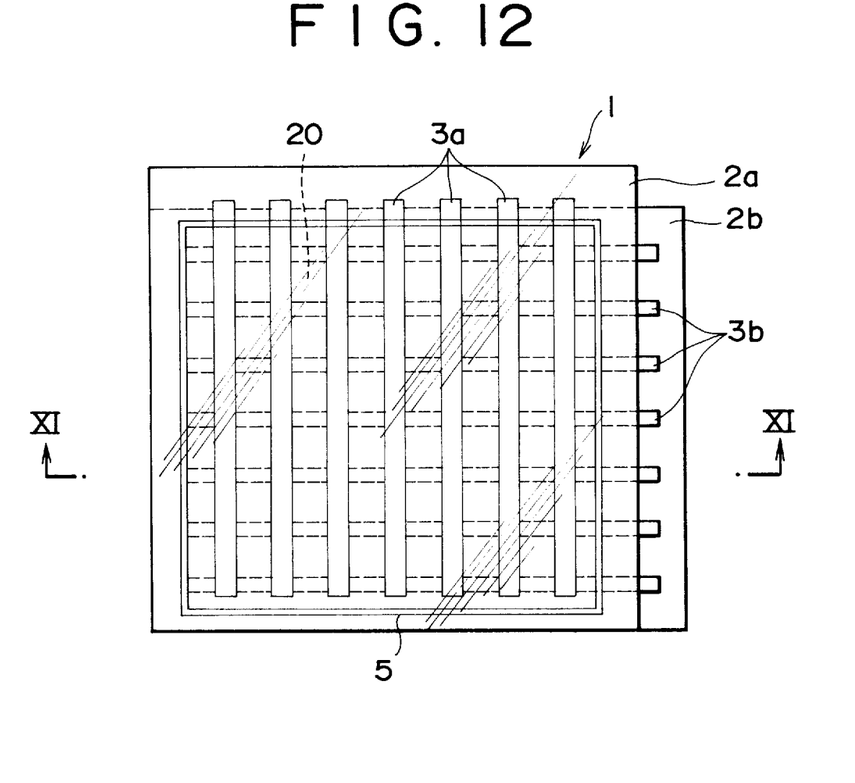
FIG. 12 is a plan view of the liquid crystal display device.

A liquid crystal display device is constituted, for example, as shown in FIGS. 11 and 12. That is, the device has a cell structure 1 having two sheets of glass substrates 2a, 2b in which a transparent electrode 3a made of ITO (Indium tin Oxide) and a liquid crystal alignment film 4a made of polyimide or SiO, and a transparent electrode 3b made of ITO and a liquid crystal alignment film 4b made of polyimide or SiO are successively formed by coating or deposition on the inner surfaces of the glass substrates which are opposed at the alignment films and between which liquid crystals 20 are injected and filled.

Figure 13:
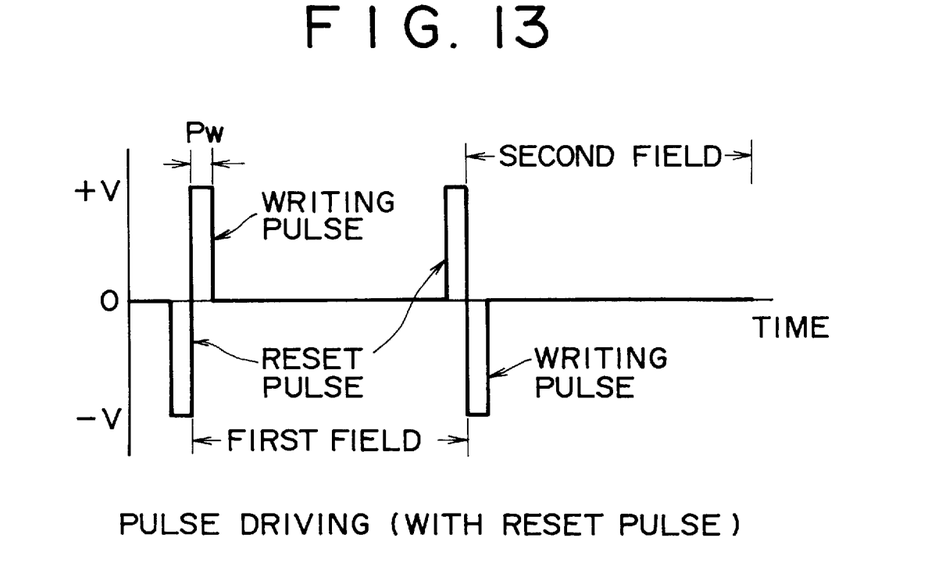
FIG. 13 is a driving waveform chart for the liquid crystal display device.

The electrodes 3a, 3b are formed each in a stripe pattern and intersected with each other as a matrix, to which a voltage is applied selectively at intersecting region in a time sequential manner. FIG. 13 illustrates an example of a general driving waveform for a liquid crystal device, showing a pulse driving method with reset pulses of keeping an electrically neutral condition in a field by adding a reset pulse just before writing with a pulse width PW.

Further, the periphery of the liquid crystal 20 is sealed with a sealing member 5 so that it has a predetermined thickness and a cell gap is maintained by a spacer of glass beams (not illustrated). If the alignment films 4a, 4b are made of an organic material, a rubbing treatment is applied in the step of manufacturing the cell 1 for the orientation of liquid crystal molecules.

Such a liquid crystal display device has now been under an accelerated development as a flat display, for which a twist nematic liquid crystal display, ferroelectric liquid crystal display and the like are used. While various appropriate driving techniques can be adopted for them, a problem exists in the optimization of material properties in order to enhance the display performance.

Particularly, in a case of a display using a ferroelectric liquid crystal (FLC), bistable states of liquid crystal molecules that yield images which can be viewed from large angles can be switched within micro seconds using passive matrix driving systems.

However, the bistable and thermotropic nature of the FLC mixtures makes it difficult to the achievement of smooth grey levels and causes to increase the temperature dependence of all material properties (for example, viscosity, elastic constant and layer structure) and electro-optical properties (for example, contrast ratio, threshold voltage, rise time and grey level).

The temperature dependence degrades the display performance, for example, image quality or contrast depending on the working temperature, however, no effective means capable of dissolving the problems have been yet actually proposed.

SUMMARY OF THE INVENTION

An object of the present invention is to provide a liquid crystal display device such as an FLC display with remarkably reduced temperature dependence for the liquid crystal properties.

The present inventors have made an earnest study for the foregoing problems in the prior art, studied on the temperature dependence of each of the layer tilt angle, layer-spacing, and effective cone angle of the liquid crystal (further, for the effect of a series of differently substituted phenyl-pyrimidine chiral additives on the effective cone angle and the threshold voltage) and, as a result, have accomplished the present invention based on the finding that minimization of the temperature dependence of the layer tilt angle is one of the key points that lead to the development of large-scaled FLC displays.

That is, the present invention provides a liquid crystal optical device such as a liquid crystal display in which a plurality of substrates (for example, glass substrates) are opposed to each other at a predetermined spacing, with an electrode (for example, transparent ITO electrode) and a liquid crystal alignment film (rubbed polyimide film or obliquely deposited SiO film) being disposed to each of opposing surfaces, and a liquid crystal material (particularly, ferroelectric liquid crystal: FLC) is disposed between the gap, wherein the liquid crystal material has a layered structure, and the change of the layer tilt angle is less than 3° in an entire temperature range of a smectic C* phase.

In the liquid crystal optical device according to the present invention, since the change of the layer tilt angle of the liquid crystal constituting the layer structure is less than 3° within the entire temperature range of the chiral smectic C: smectic C* (SmC*) phase, for example, at least from −5° C. to 57° C. (in other words, the device has a uniform layer structure that the layer tilt angle does not change by more than 3° in the entire temperature range of the SmC* phase), the property of the layer structure in the SmC* phase such as a threshold voltage does not substantially change depending on the temperature change, and the temperature dependence can be reduced remarkably. "Layer tilt angle" means (herein and hereinafter) an angle δ to be described later and shown in FIG. 10.

DETAILED DESCRIPTION OF THE PREFERRED EMBODIMENTS

In the liquid crystal optical device according to the present invention, it is desirable that the change of the layer spacing that governs the layer tilt angle (layer spacing of liquid crystal layers of a plurality layer structure, particularly, a tilted bookshelf texture) is less than 2 Å in the entire temperature range of the SmC* phase. "Layer-spacing" means (here and hereinafter) a spacing d to be described later and shown in FIG. 10.

Further, in order to reduce the change of the layer of tilt angle within the above-mentioned range in the SmC* phase, the layer tilt angle is preferably larger than 20° in the smectic A (SmA) phase.

In order to obtain the layer tilt angle (more than 20°) in the SmA phase, it is preferred that atom groups substituted and introduced with fluoro atoms are bonded to chiral molecular skeletons of ferroelectric liquid crystal molecules. More specifically, the atom groups in which the fluoro atoms are substituted and introduced to the rigid core of the ferroelectric liquid crystal molecules has a fluorinated phenylene ring, for example, 2,3-difluorophenylene group.

The layer tilt angle of the SmA phase can be shown by an electroclinic angle. That is, an electroclinic effect is observed in the tilted smectic A phase when the electroclinic angle of the liquid crystal material (tilt angle by the electroclinic effect) is larger than 5° at a phase transition temperature $(T_{AC})+0.5K$ and at an electric field of 20 V/$\mu$m or larger than 2.5° at a phase transition temperature $(T_{AC})+2K$ and at an electric field of 20 V/$\mu$m.

In the liquid crystal optical device according to the present invention, the temperature dependence of the electro-optical response of the ferroelectric liquid crystal (FLC) is reduced by combination of the SiO-alignment films (liquid crystal alignment films), specified ferroelectric liquid crystal mixtures and special alignment techniques. The FLC mixtures usable herein are those FLC mixtures based on phenyl-pyrimidines which will be used as a typical example of FLC with desirable properties.

An electric field alignment technique of applying rectangular waves and bipolar pulses are used to create uniform textures in a test cell utilizing SiO alignment layers in anti-parallel alignment by pretilting liquid crystal layers strongly (that is, at a large pretilt angle). Further, uniform tilted bookshelf textures can be obtained by application of square waves in the smectic A phase and by bipolar pulses in the smectic C* phase succeeding thereto, respectively.

The degree of the layer tilt angle in the smectic C* phase depends on the applied voltage. The layer tilt angle is the smallest in the virgin textures. As the electric field strength increases and an alignment threshold voltage is surpassed, the layer tilt angle is increased.

It is important that the quality of alignment for the smectic C* phase is determined at the transition point from the smectic A phase to the nematic phase, that is, at a very high temperature. This suggests a very strong anchoring force of the liquid crystal layer at the SiO film boundary. Further, it is only possible to change the layer tilt angle of the virgin texture and strong anchoring force is exhibited also when changing the alignment condition in the nematic phase. It seems that the first layer covering the SiO surface remain in its original alignment even in the isotropic phase at Tni+20K (Tni represents phase transition point from the nematic phase to the isotropic phase).

Following the alignment procedures described below, uniform tilted bookshelf structures can be obtained which have an usual small temperature dependence of the layer tilt angle, exhibiting a maximum layer tilt angle at an intermediate temperature in the SmC* phase. Since cos δ and d are in a linear relationship (actually d∝ cos δ) assuming the layer tilt angles as δ and the layer spacing as d, it can be supposed that the layer tilt angle is controlled by the layer spacing.

An explanation of this view can be based on strong interactions between the FLC and the alignment films which, due to the reasons of not breaking the layer structure, prohibit any further reduction of the layer tilt angle. In addition, on approaching the crystalline phase, a gradual increase of the transpopulation in all methylene units of the alkyl chain of the phenyl-pyrimidine compound could reduce the effective free volume thereof.

The distinctly tilted smectic A phase texture promotes reduction of the temperature dependence of the layer tilt angle in the SmC* phase. The tilt of the A phase is due to pretransitional or inherently strong surface interactions between FLC and SiO alignment films. Measurement of the electroclinic effect independently proves an unusual texture of this A phase, and this effect can not be observed in ordinary smectic phase in which the liquid crystal director aligns parallel to the layer normal.

The above-mentioned results of 2,3-difluoro-substituted phenyl-pyrimidine can be compared with those of non-fluorinated parent analogs. For these mesogens, the temperature dependence of the layer texture phase increases significantly in the high temperature smectic C* phase, but at present, it is not clear which of the physical parameters affected by fluorination is responsible to this behavior. Nevertheless, it needs to be pointed out that this behavior is almost the expected one for standard FLC.

The above-mentioned small temperature dependence of the parameters characterizing the smectic C* texture can be exploited to reduce the temperature dependence of the electro-optical properties. Accordingly, the fluorinated chiral additives show a larger cone angle and the plateau region can be extended to higher temperatures compared with non-fluorinated analogs.

In addition, also the threshold electric field shows a significantly reduced temperature dependence of the fluorinated material compared with the parent material. The fluorine substitution technique offers a new route to minimize the temperature dependence of electro-optical responses in FLC displays.

The FLC materials usable in the present invention can include liquid crystal compositions comprising base liquid crystals containing one or more of compounds represented by the following general formula (I) and one or more of compounds represented by the following general formulae (II) and (III), with addition of one or more of compounds represented by the following general formula (IV):

General formula (I):

where $R^1$ and $R^2$ represent each an alkyl group of 4 to 12 carbon atoms, General formula (II):

where $R^3$ and $R^4$ represent each an alkyl group of 4 to 12 carbon atoms, General formula (III):

$R^3$ and $R^4$ represent each an alkyl group of 4 to 12 carbon atoms,

General formula (IV):

where $R^5$ and $R^6$ represent each an alkyl group of 4 to 12 carbon atoms, and C* represents an optically active asymmetric carbon.

In this case, chiral liquid crystals (compound of the general formula (IV) described above) is preferably added at a concentration of less than 50 parts by weight based on 100 parts by weight of the final preparation. The addition amount is more preferably less than 20 parts by weight.

(Examples)

The present invention will be explained more in details by way of examples.

Figure 10:
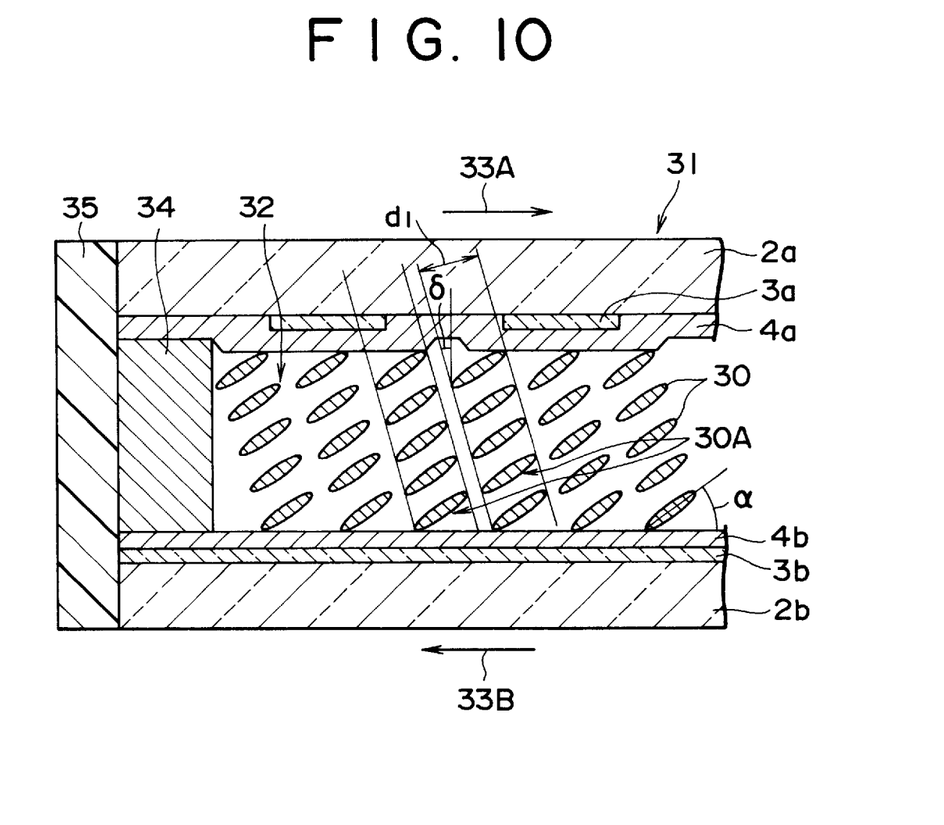
FIG. 10 is a schematic cross sectional view of a liquid crystal display device usable in the present invention.

The structure of a liquid crystal optical device 31 as an FLC display in this example is at first explained with reference to FIG. 10. In this liquid crystal optical device 31, transparent ITO electrodes 3a, 3b, and liquid crystal alignment films 4a, 4b are formed on opposing surfaces of transparent glass substrates 2a, 2b opposed to each other, respectively, and liquid crystal 30 is injected into a spacing (gap) 32 between the glass substrates 2a, 2b on the side of the alignment films. The liquid crystal is FLC forming a smectic phase at a working temperature. A pretilt angle α between the alignment films 4a, 4b obliquely vapor deposited in the directions 33A, 33B illustrated in the drawing (or subjected to rubbing treatment) and the liquid crystal 30 is, for example, more than 3°. A spacer 34 is disposed to the periphery of the device to maintain the gap 32 and the periphery is sealed with an adhesive 35.

The liquid crystal molecules of FLC 30 have a tilted bookshelf texture with a pretilt angle α and the alignment direction with each of the alignment films 4a, 4b being in anti-parallel orientation, and each of the liquid crystal layers 30A is arranged at a layer spacing d being inclined at a layer tilt angle δ.

Then, by using a series of novel ferroelectric liquid crystals (FLC) containing various kinds of phenylpyrimidines as FLC 30, the temperature dependence of the tilt angle δ, the layer spacing d and the effective cone angle θeff of the layer 30A were examined.

As a result of X-ray diffraction measurements for the SmC* phase to be described later, a tilted bookshelf texture was confirmed in a cell using SiO layers arranged an anti-parallel orientation and it was found that the layer tilt angle δ is maximum when all the mixtures are at an intermediate temperature in the SmC* phase. In a certain mixture, the layer tilt angle δ changed only by 3° for the entire SmC* phase. This is supported also by the results of measurement for the layer spacing d and the effective cone angle θeff, and effective means was found for controlling the temperature dependence of the electro-optical properties such as contrast ratio or threshold voltage Vth at the liquid crystal display.

With regard to the temperature dependence of the layer tilt angle δ, the layer spacing d and the effective cone angle θeff, as well as the effect of a series of the different substituted phenyl-pyrimidine chiral additives on the effective cone angle and the threshold value voltage, explanation will be made hereinafter for the details of the experiment, the results of X-ray and electro-optical measurement for the temperature dependence and, further, the contents of studies on the results of the measurement, and means for minimizing the temperature dependence of the threshold voltage is proposed.

(Experiment)

Figure 9:
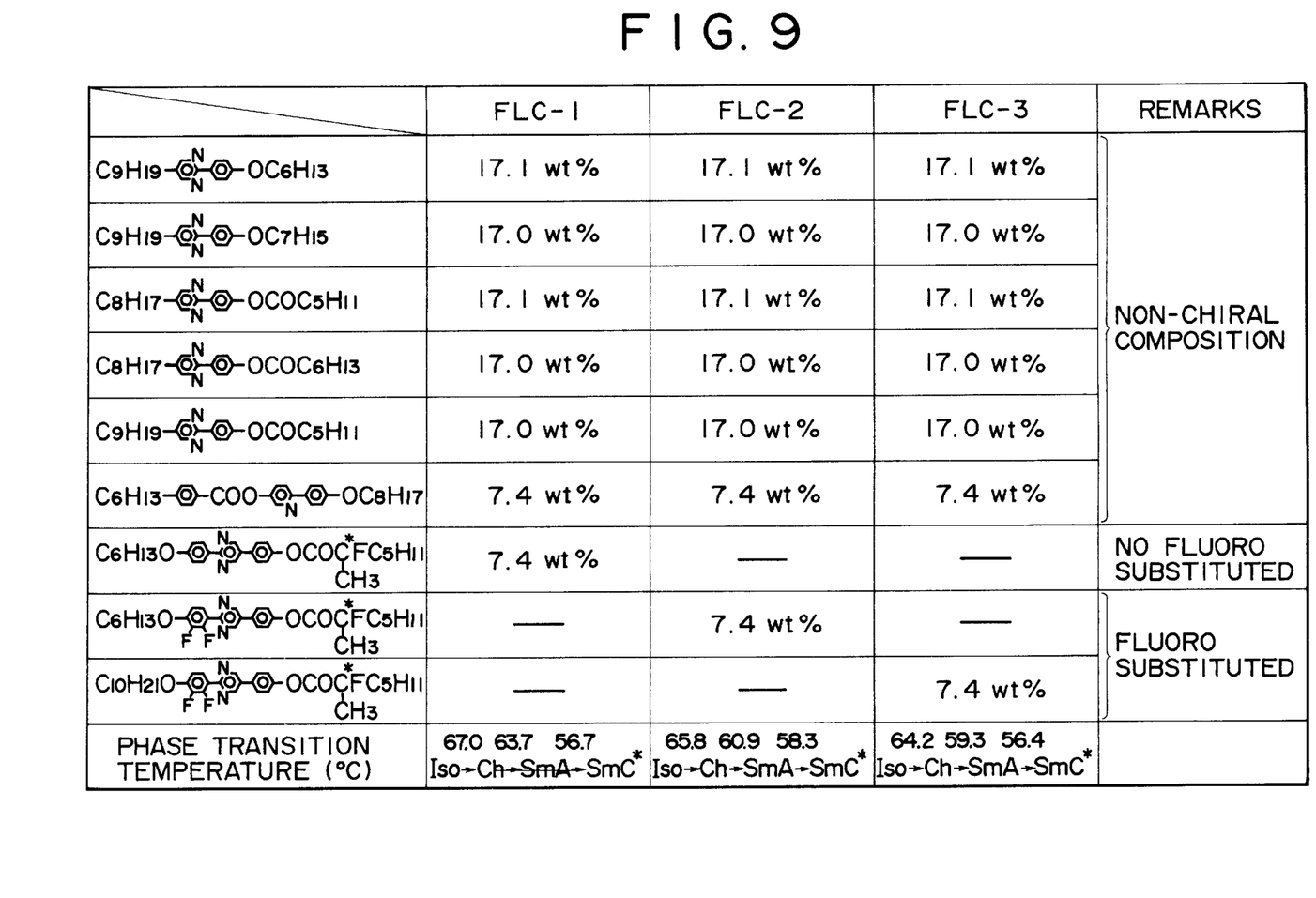
FIG. 9 is a view collectively illustrating the structural formulae and the compositional ratios for various types of FLC compositions (FLC-1, FLC-2, FLC-3)

FIG. 9 shows basic mixtures mainly comprising phenylpyrimidine (non-chiral compositions), as well as structural formulae of chiral additives added thereto, and compositional ratio and the phase transition temperature of them.

The phase transition temperature was determined on a Mettler FP90DSC instrument. It should be noted that the smectic C* temperature range or temperature region is large (60–65K), while that of the smectic A temperature range of is as narrow as only 2.5–4K.

Each of chiral additives differs with respect to the presence or absence of fluorination at 2,3-positions on the phenylene ring (the number of fluorine atoms: 0 or 2) and alkyl-chain length extension (number of carbon atoms: 6 or 10). These materials were aligned in anti-parallel alignment in a test cell as shown in FIG. 10 having obliquely evaporated SiO deposition film (500 Å thickness, 85° deposition angle with respect to normal of the substrate).

In X-ray diffraction, the test cell had a thickness of the glass substrate of 100 μm (cell gap size varying from 1.5 to 2.0 μm).

Uniform textures have been obtained by using rectangular pulses (100 Hz, 30 V) while slowly cooling from the isotropic phase to the low temperature smectic A phase, followed by bipolar pulses (30 V, τ=250 μs, duty cycle=10 ms) on cooling to room temperature respectively.

The X-ray diffraction measurement were carried out on a Rigaku RU-300 System, in which the system has a copper target electrode and operates at 200 mV and 50 kV. The temperature was controlled to about ±1K. θ-scans between 40° and 140° were used, to determine the layer tilt angle δ, while the layer spacing d was evaluated based on 2θ scans of 2.0° and 3.5°.

Electro-optical measurement was performed by using a Nikon Optophoto 2 Pole microscope equipped with a Hamamatsu Photonics HKP-C665 photomultiplier. Then, the device is driven by an Analogic 2020 optical waveform generator in connection with a 4005 high speed power amplifier NF Electronics Instruments, and the electro-optical response was monitored on a PM3320A oscilloscope of Philips.

(Result)

Tilted Bookshelf Texture

Figure 1A:
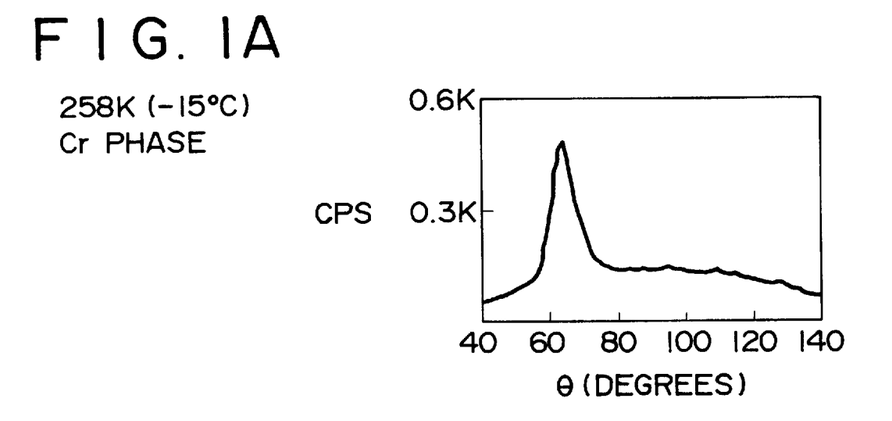
FIGS. 1A–1E are X-ray diffraction spectral charts, depending on the temperature, of FLC compositions (FLC-2) usable in the present invention.
Figure 1B:
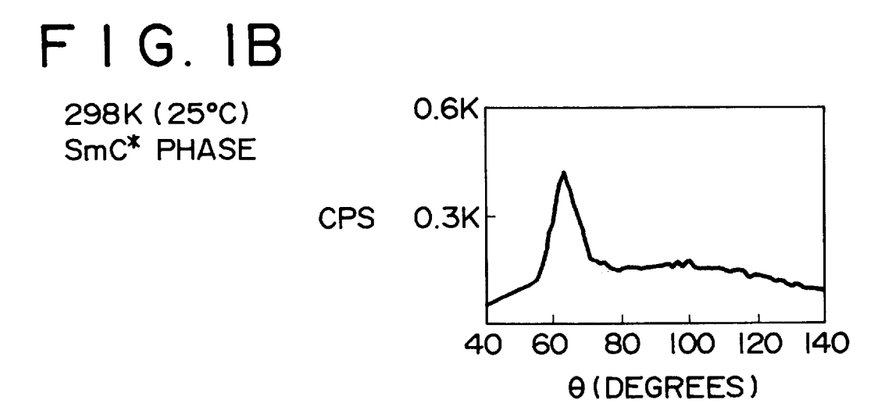
Figure 1C:
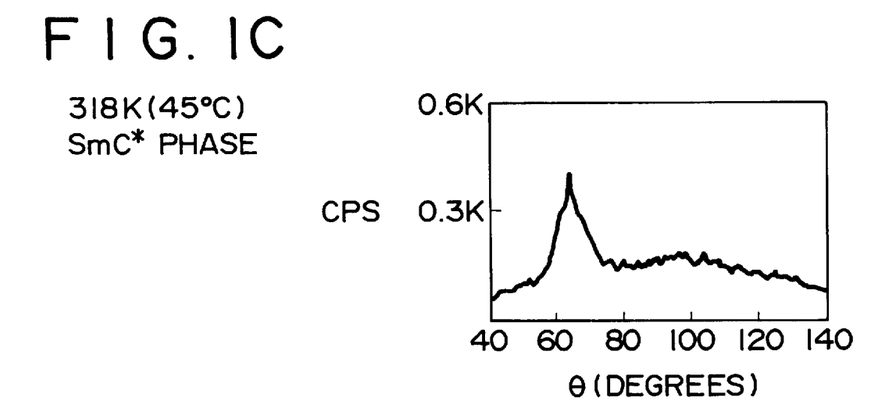
Figure 1D:
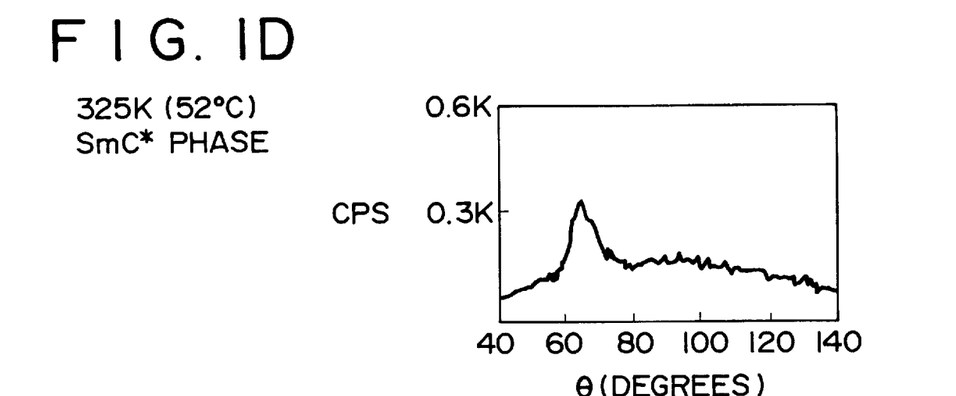

FIG. 1 shows X-ray diffraction spectra of FLC-2 shown in FIG. 9, in which FIG. 1(b) shows a X-ray diffraction pattern thereof at room temperature. All of other mixture also show similar diffraction patterns each having a single peak to suggest that a tilted bookshelf texture is formed.

The layer tilt angle varies between 22° and 32° depending on each of the materials used. For this type of chiral additives, the layer tilt angle increases depending upon the degree of fluorination for the phenylene ring of the core and extension of flexible alkyl-chain. Further, the line width at half height is about 8° for all samples, which reflects a relatively large distribution of layer tilt angles.

FLC-2

In the SmC* phase, the temperature dependence of the layer tilt angle was measured, and different dependencies have been observed for the chiral additives shown in FIG. 9.

Figure 2:
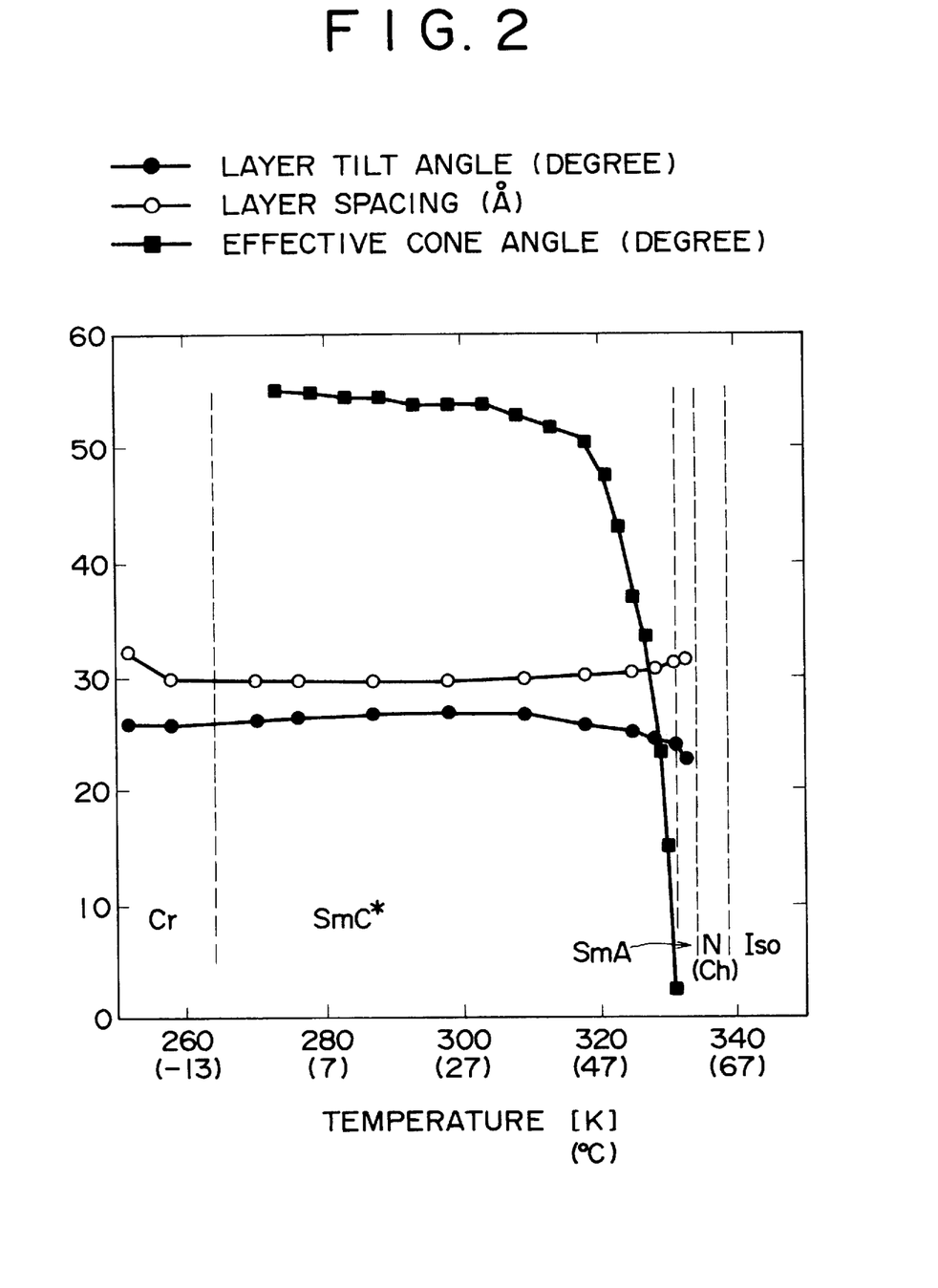
FIG. 2 is a graph illustrating the temperature dependence, for example, of a layer tilt angle of FLC composition (FLC-2) usable in the present invention.

FIG. 2 shows the result for FLC-2 possessing a 2,3-difluoro-substituted core phenyl ring.

From the results, the temperature dependence of the layer tilt angle of the mixture is extremely small, varying within a range between 25° and 27° in the entire smectic C* phase and does not changes more than 3°, and only a small increase of the change is observed upon approaching the smectic A phase transition point. This is accompanied by broadening of the diffraction peak width and a reduction of the signal-to-noise (S/N) ratio for the X-ray diffraction. In the two phenomena, the latter behavior is common to each of ferroelectric liquid crystals, while the former is exceptional.

Figure 1E:
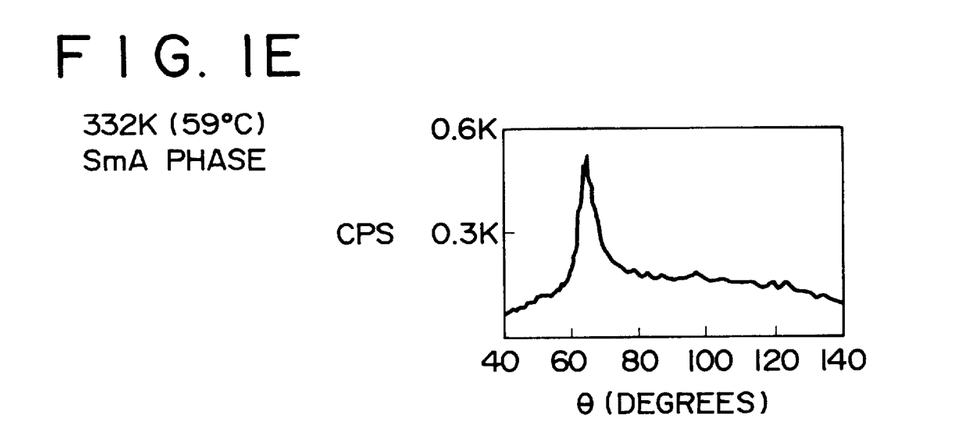

Furthermore, in the smectic A phase, a significant temperature dependence of the layer tilt angle of more than 20° was observed. Compared with the high temperature smectic C* phase, the diffraction peak width decreases (refer to FIG. 1(e)) and the S/N ratio is improved significantly.

As the temperature was raised further to the nematic phase, this peak disappeared as expected. When it was cooled to the SmA phase, the above-mentioned phenomenon was reproduced confirming the reversibility of the alignment process.

When cooling the test cell below room temperature, the layer tilt angle did not increase, but exhibited a shallow maximum limit around 290K and the layer tilt angle was also decreased as the temperature was further lowered. This is another important finding for the application of the SiO alignment film to the panel and, like that the properties in the Shevron-type textures, can be utilized to minimize the temperature dependence in the display based on the known texture.

The layer spacing of the smectic C* phase varied between 29 Å and 30.5 Å namely 2 Å or below as shown in FIG. 2.

This slight temperature dependence demonstrates the above-mentioned behavior of the layer tilt angle.

Upon transfer to the crystalline phase, the layer tilt angle did not change, but when cooling the sample to temperature below 260K, a texture was crystallized which irreversibly changed the alignment of these FLC mixtures in the test cell and could not restore the initial texture unless proper electric field treating alignment was conducted.

It can be seen from FIG. 2 that the cone angle inherent to FLC is substantially stabilized within the temperature range of the SmC* phase.

As shown in FIG. 2, it was found that the temperature dependence for each of the layer tilt angle, the layer spacing and cone angle is small. In order to investigate the origin of this surprising fact, that is, extremely useful material property, a liquid crystal composition containing a chiral dopant not having fluorine to the aromatic ring core (FLC-1) and a liquid crystal composition (FLC-3) containing a chiral dopant with varied alkyl chains bonded to the fluorinated core were synthesized.

FLC-1

It was found that the results for FLC-2 are apparently different from the results obtained by FLC-1 having no phenylene ring as a fluoro-substituted core.

Figure 3:
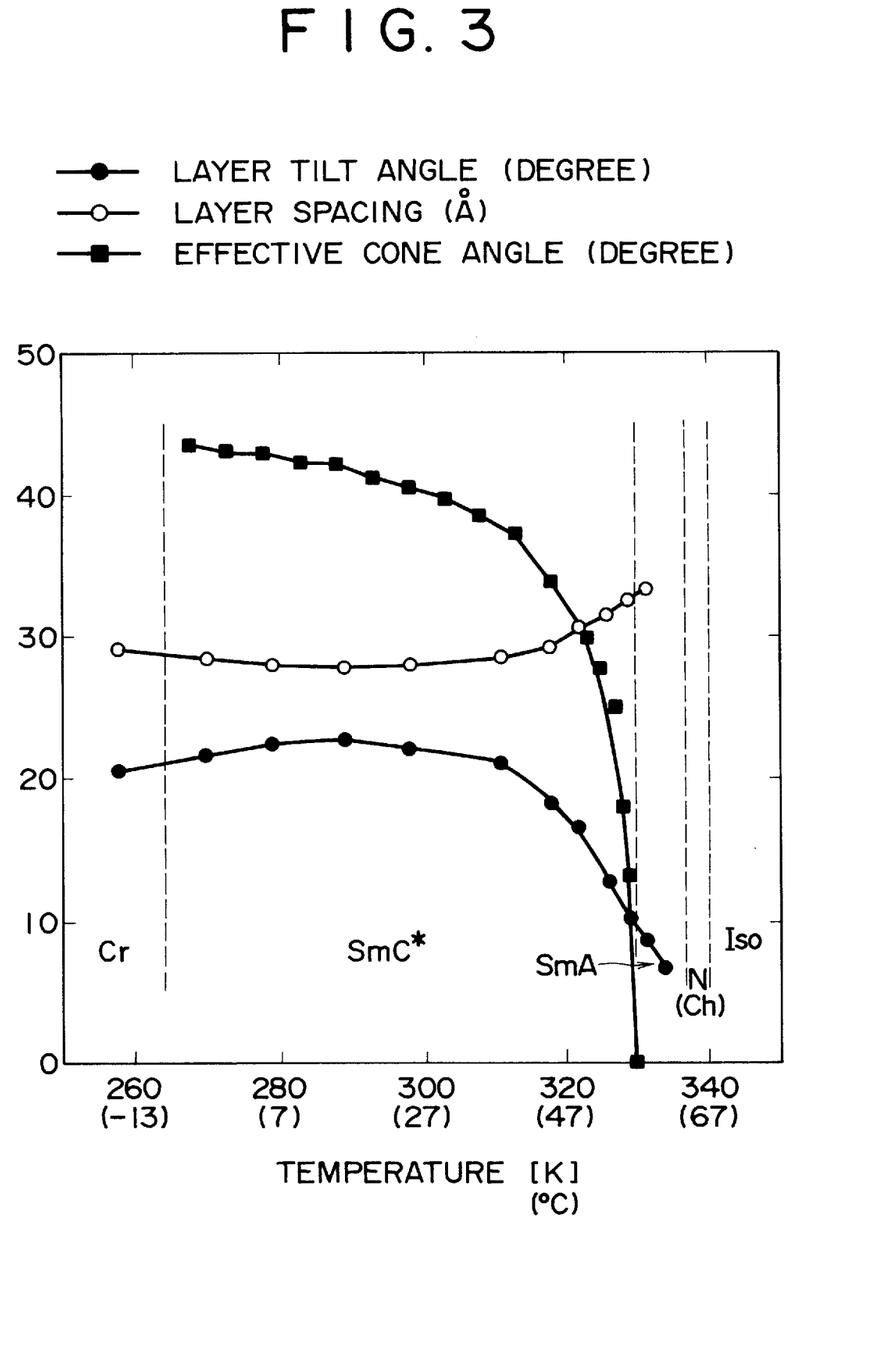
FIG. 3 is a graph illustrating the temperature dependence, for example, of a layer tilt angle of FLC composition (FLC-1) for comparison.

That is, FIG. 3 summarizes the result of X-ray diffraction for FLC-1, showing a significantly large change of the layer tilt angle in the SmC* phase from 23° to 10°. The low temperature range has similar features as the fluorinated analogs, except that the overall tilt is smaller by 3°. Again, a maximum value was observed at T=290K, but this time the layer tilt angle reduces significantly as the smectic A phase transition temperature is approached. This typical temperature dependence is reflected also by an increase of the layer spacing in the smectic C* phase from 28 Å to 32 Å.

In spite of such a typical behavior, the smectic A phase still possesses a small temperature dependence of the layer tilt angle of less than 10°.

FLC-3

Comparison of the laterally difluoro-substituted core phenylene ring derivatives between n-hexyl chain (FLC-2, FIG. 2) and n-decyl chain (FLC-3, not results illustrated) shows remarkable agreement with respect to the temperature dependence of the layer spacing and the layer tilt angle.

In FLC-3, the layer tilt angle varies only within a range about from 29.5° to 32.5° in the entire smectic C* phase (does not change more than 3°). The maximum region was observed at T=310K, higher by 20K than for FLC-2. Even though the layer tilt angle was about 3° larger than in the case of hexyl-homolog (FLC-2), the temperature sensitivity remains the same. This is also reflected in the layer spacing variation within a range from 32.5 Å to 34.5 Å in the ferroelectric liquid crystalline phase.

Furthermore, also in the smectic A phase, a layer texture tilted by more than 20° has been observed in the accessible temperature range.

For all of aligned FLC-mixtures, effective optical cone angles have been shown sufficiently in order to discuss the effect of texture changes on electro-optical properties.

(Contents of discussion)

Temperature dependence of layer tilt angle

FIGS. 2 and 3 summarize the temperature dependence of d, δ, d and θeff for each of mixtures to be investigated, in which the layer tilt angle shows a maximum value at an intermediate temperature in the smectic C* phase in each of the cases. This unusual behavior has not been observed in bookshelf textures so far. However, in the case of chevron textures, this phenomenon is known (JAP. J. Appl. Phys. 29(1990) L 984, Proc. 6th Intl, Symp, on Electrets, Oxford (1988) 334), and also utilized in FLC displays. The expression "quasi-bookshelf-texture" (QBS) has been introduced (in the latter literatures described above).

In contrast to the small layer tilt angles of less than 15° in the QBS textures, the tilted bookshelf textures shown by this experiment exhibit maximum tilt angles of about 30°, the reason for this being the different layer alignment (rubbed polymer vs SiO).

Further, upon lowering the temperature, the layer tilt angle of the bookshelf structure reduces slowly, reaching a finite limiting value in the crystalline phase. When investigating the high temperature range at the end of the smectic C* phase, an unusual non-O layer tilt angle was observed at the phase transition to the SmA phase. This property of the SmA phase induces a lower limit value to the layer tilt angle in the high temperature SmC* phase that assumes a second order phase transition. The extent for the change of the layer tilt angle of the smectic A depends on the texture of the chiral additive used.

The unusual structural properties of the smectic A-phase were further evidenced by the observation of strong alignment control forces between the obliquely deposited SiO films and FLC, as well as pronounced electroclinic effects. This strong interaction necessitates electric field alignment treatment at high temperature in order to obtain a uniform texture (nematic-smectic A phase transition).

Effect of Fluorine-substitution

To analyze the effect of fluorine-substitution at the core phenylene ring on the layer texture, FLC-1 and FLC-2 as chiral additive-containing FLC mixtures need to be compared. At all temperatures, the layer tilt angle of the fluorinated chiral additive is larger than that of the non-fluorinated material. However, the layer spacing does not vary significantly even with substitution, and it is almost a minimum value at T=290° K.

For the non-fluorinated FLC-1 composition, it was observed that an almost typical layer tilt angle behavior is shown in the smectic C* phase, that is, the tilt angle reduced significantly as the temperature was approaching the smectic A transition point. This contrasts significantly with the results of the fluorinated analog FLC-2. For this FLC mixture, the layer tilt angle remains almost constant even when the temperature approaches the SmA transition point.

The observed small layer tilt angle change for FLC-2 can be explained as the result of the reduced change in the layer spacing, by controlling the layer packing, while carefully balancing the macroscopic properties (for example, viscosity and elastic constants) and the molecular properties (for example, average conformation, magnitude of the dispersion force, etc.).

It is reported that the intermolecular force is reduced by the lateral fluorine substitution of phenylene rings in the core of FLC. As a result, the viscosity of the phase is lowered and the elastic constants, as well as surface interaction of the FLC are reduced. In order to obtain a deeper insight into the physical principal governing the temperature dependence of the layer formation, work is underway to determine these parameters independently.

Effect of the Length of Alkyl-Chain

As described above, the results of X-ray investigation on the two types of 2,3-difluoro-substituted-2-phenyl-pyrimidines (FLC-2 and FLC-3) are very similar with each other. However, several properties of the layer textures can be controlled finely by varying the alkyl chain length of the chiral additive.

In this case, an extension of the hexyloxy chain (FLC-2) to decyloxy chain (FLC-3) increases the layer tilt angle by about 3° in the entire smectic C* temperature range. In addition, the layer spacing also increases by about 2 A to 3 A because of the chain extension. This corresponds favorably to the calculated value for the length of the N-butyl chain in all geometrical isomeric (transisomer) stereoconformation.

Relation Between θ and d

In the entire smectic C* phase, the temperature dependence of the layer spacing dc approximately follows the layer tilt angle δ according to the simple geometrical relation dc=dacos δ.

Figure 4:
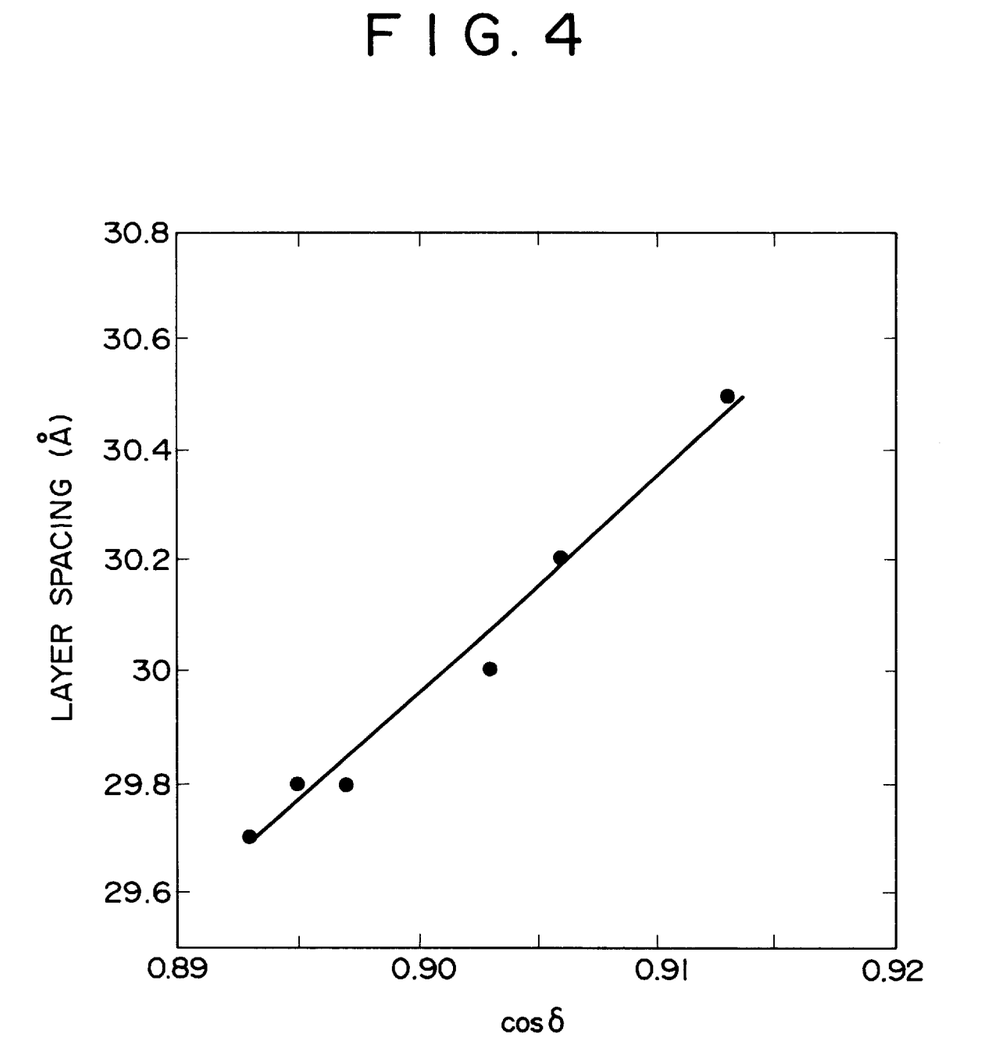
FIG. 4 is a graph illustrating the temperature dependence, for example, of a layer tilt angle of the layer spacing of FLC compositions (FLC-2) usable in the present invention.

FIG. 4 shows this relation for FLC-2. This slope is defined depending on the layer spacing da=35.7 Å in the smectic A phase, which corresponds well with the length of the methogene in a case of assuming all of them as trans-conformation.

In a similar investigation on the chevron textures of Mochizuki, et al., a similar relationship was found between the layer spacing and the layer tilt angle in the smectic C* phase (Jap. J. Appl. Phys. 29 (1990) L984). In this known study, it was succeeded in relating the layer spacing of the smectic A phase to the smectic C* layer tilt angle. However, in the experiment of the present inventors, such a limiting value as showing the above-mentioned relationship could not be observed because of the tilted layer texture. In fact, in the SmA phase, the above-mentioned simple relation is no more valid showing significant changes in the organization of the layer texture. Investigations to understand the nature of the smectic A phase have now been under progression.

Electro-optical properties

In order to evaluate the advantages of the reduced temperature dependence of the layer tilt angle in the tilted bookshelf textures, electro-optical measurements were carried out. FIGS. 2 and 3 show the intrinsic cone angles determined in the smectic C* phase. For the laterally fluorinated mixtures FLC-2 (or FLC-3), significantly larger values than those for the non-fluorinated analog were determined, but this prominent behavior of fluoro-substituted methogenes was reported already Liq. Cryst. 15 (1993)893).

Particular emphasis was placed, particularly, on the temperature dependence of the intrinsic cone angle in FLC-2 in order to maintain a constant value between 270K and about 320K. When the viscosity of the fluorinated mixture is reduced, this might favor the large increase of the cone angle as the temperature is lowered to below the SmA–SmC* transition point before it reaches its constant a settled value. This behavior can be utilized to reduce the temperature dependence of the contrast ratio in FLC displays.

Another point of interest is the temperature dependence of the threshold voltage. The result shown in FIG. 5 verifies that materials fluorinated at phenylene ring possess a smaller threshold voltages than the parent methogenes because of their lower viscosities compared with non-fluorinated materials.

Figure 5:
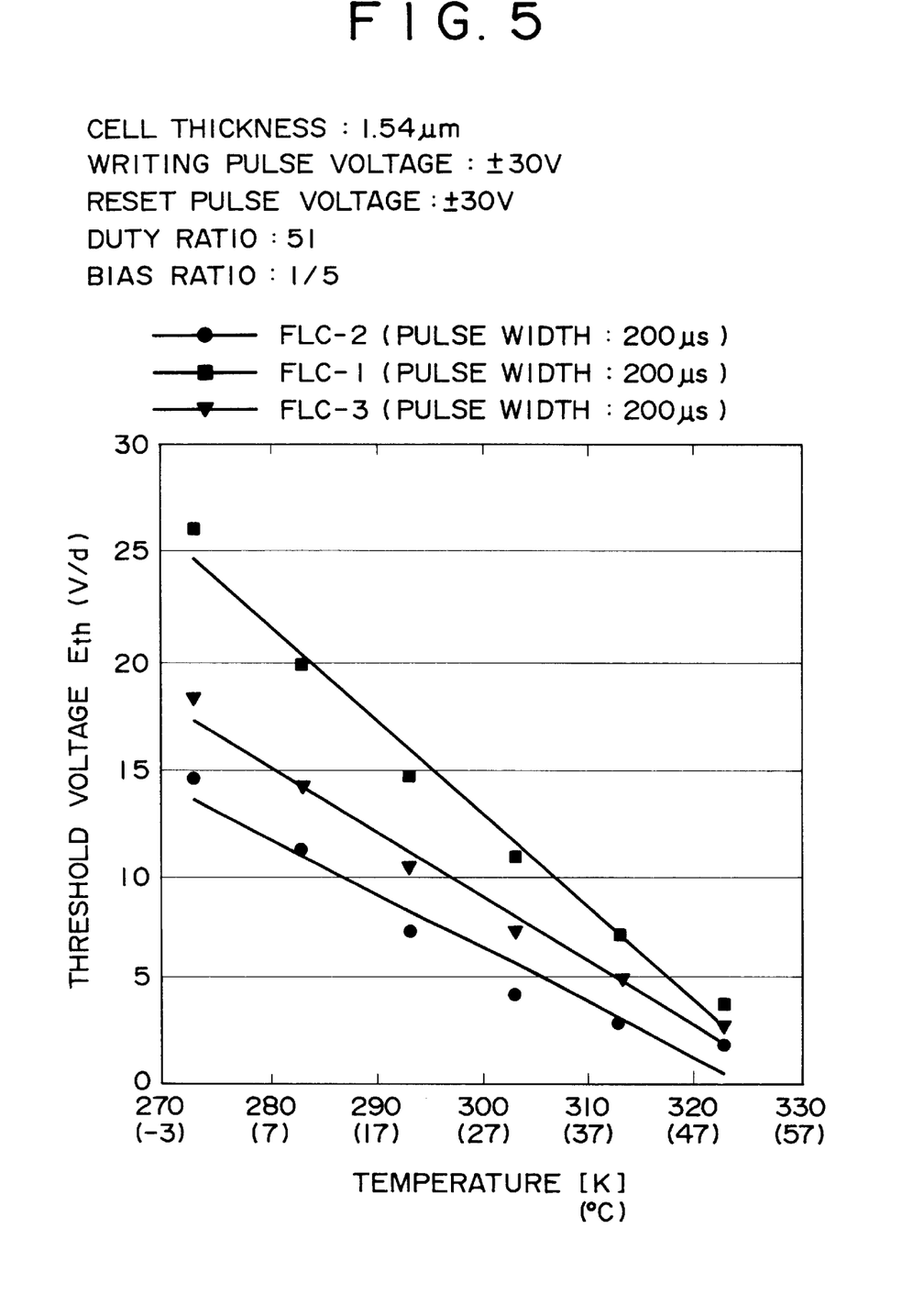
FIG. 5 is a graph illustrating a temperature dependence of a threshold voltage for various kinds of FLC compositions (FLC-1, FLC-2, FLC-3)
Figure 6:
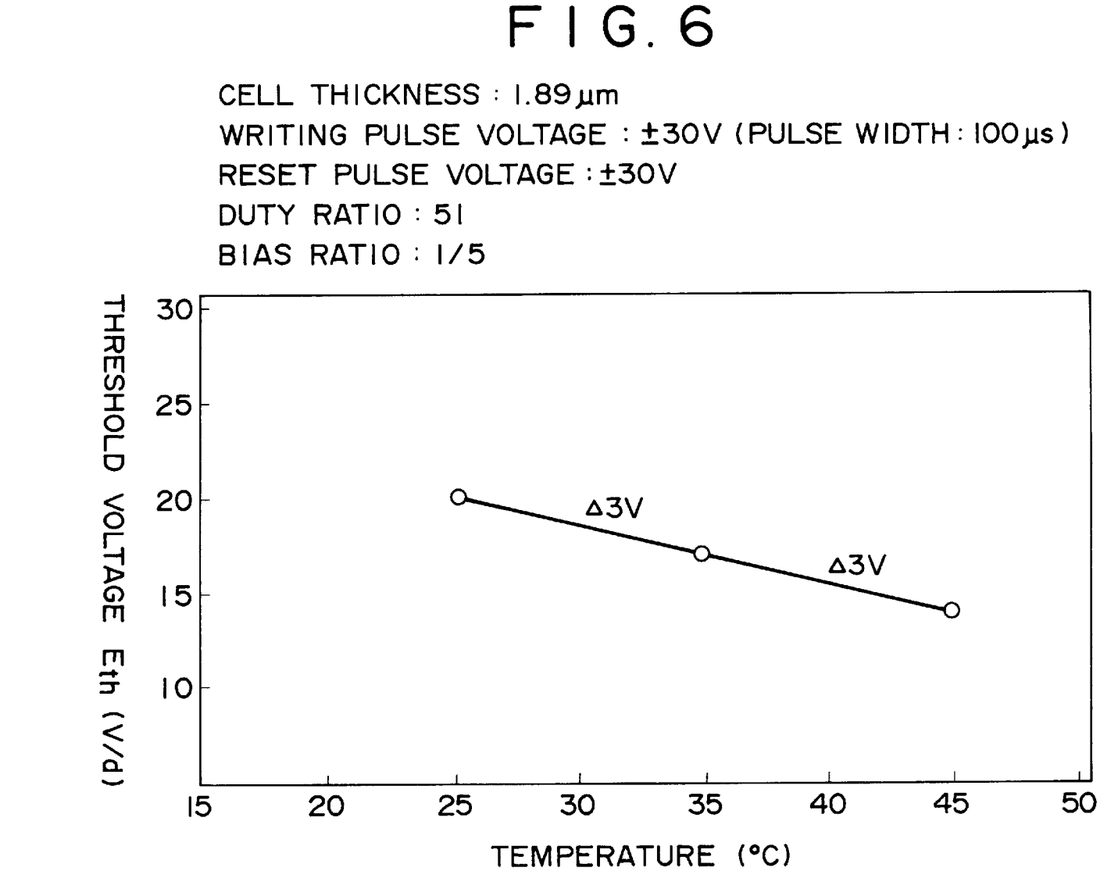
FIG. 6 is a graph illustrating a temperature dependence of a threshold voltage under other conditions of FLC compositions (FLC-2) usable in the present invention.
Figure 7:
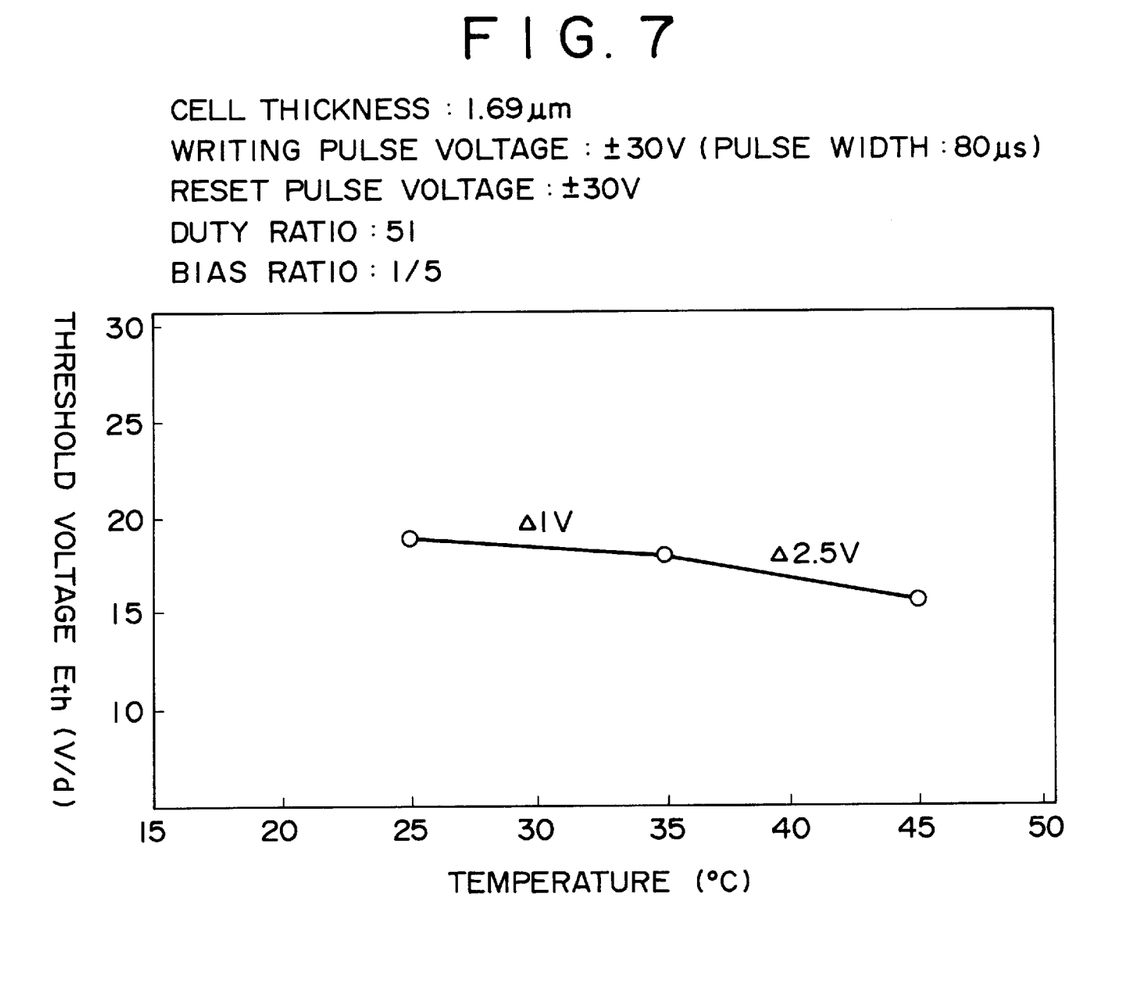
FIG. 7 is a graph illustrating a temperature dependence of a threshold voltage under other conditions of FLC compositions (FLC-3) usable in the present invention.
Figure 8:
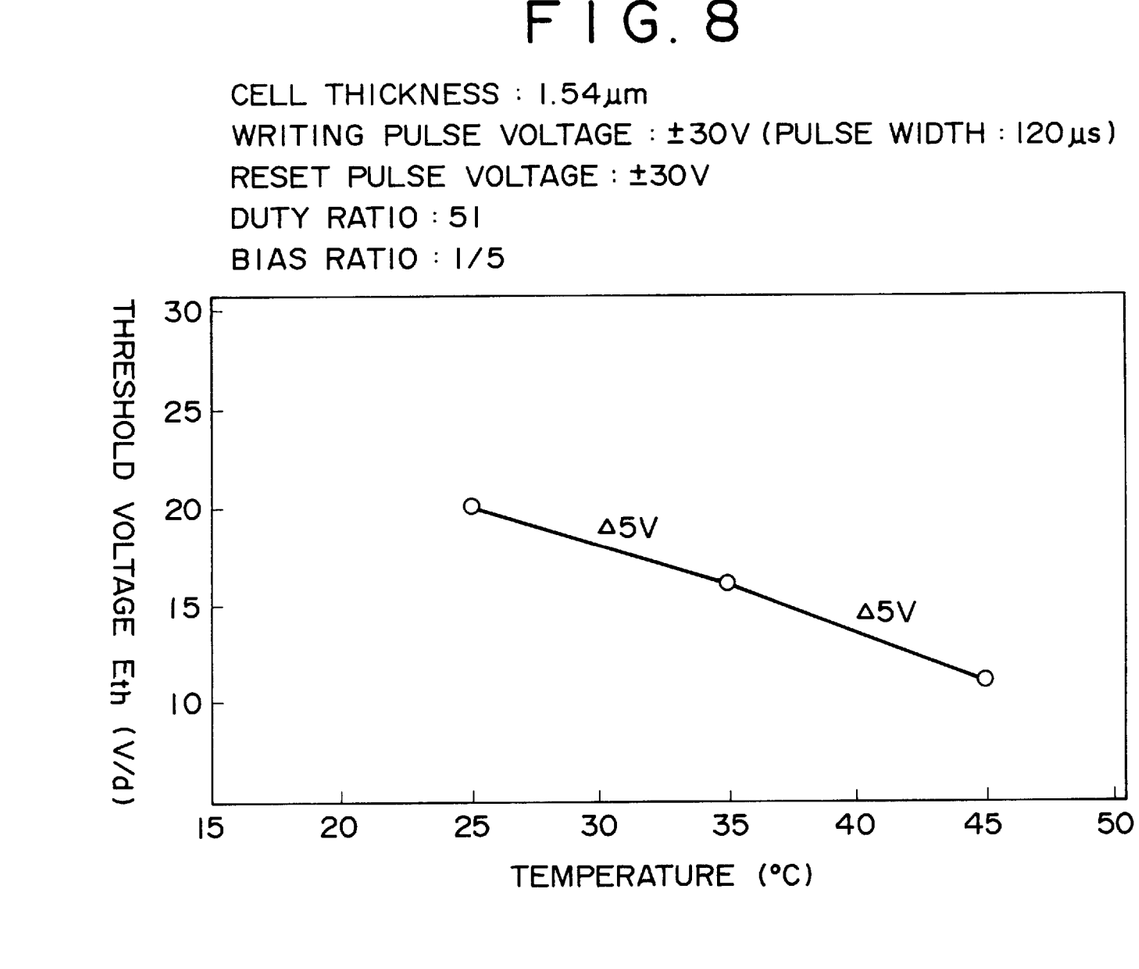
FIG. 8 is a graph illustrating a temperature dependence of a threshold voltage under other conditions of FLC compositions (FLC-1) for comparison.

In addition, as shown in FIG. 5, and further in FIGS. 6, 7 and 8, the temperature dependence of the electric field threshold value (Eth) is significantly smaller compared with that of the non-fluorinated material and, depending on the temperature range, the change of Vth can be reduced by more than 50%. The results suggest a significant influence of the layer tilt angle and the cone angle on Vth. It is apparent that these material properties are useful in displays.

Summary

As described above, it is apparent that laterally fluorinated 2-phenylene-pyrimidines are more advantageous compared with its non-fluorinated parent material. The fluorinated mixtures have a feature in that the textures are of a tilted bookshelf, in which the layer tilt angle changes very little with temperature in the entire smectic C* phase. This useful property, together with low viscosities, reduces the temperature dependence of the inherent cone angle and the threshold voltage.

Although the present invention has been explained by way of examples, such examples can be modified further on the basis of a technical concept according to the present invention.

For example, results comparable with those of examples described above can be obtained also by changing, for example, the composition, the compositional ratio and the addition amount of the FLC mixtures described above. Further, rubbed films other than the obliquely deposited SiO films may be used as the alignment films, or various methods may be adopted for controlling alignment, layer tilt angle and the like.

In addition, the texture of the liquid crystal display device, the material for the constituent portion and manufacturing method may be changed variously. Further, the device according to the present invention is applicable also to other optical uses than for the display device described above.

As has been described above according to the present invention, since a plurality of substrates are opposed to each other at a predetermined gap, with electrodes and liquid crystal alignment films being disposed, respectively, on the opposing surfaces of them, in which liquid crystal material is disposed in the gap, wherein the liquid crystal material has a layer texture and the change of the layer tilt angle is less than 3° within the entire temperature range of the smectic C* phase, a uniform layer texture is provided in which the layer tilt angle does not change more than 3° in the entire temperature range in the smectic C* phase, so that the properties, for example, of the threshold voltage of the layer texture in the smectic C* phase scarcely changes depending on the temperature change, and the temperature dependence thereof can be reduced remarkably.

What is claimed is:

1. A liquid crystal optical device in which a plurality of substrates are opposed to each other at a predetermined gap with electrodes and liquid crystal alignment films being disposed, respectively, on the opposed surfaces, and a liquid crystal material is disposed in said gap, wherein said liquid crystal material has a layered structure, and the change of the layer tilt angle is greater than 0° and less than 3° in an entire temperature range of a smectic C* phase, wherein an atom group substituted and introduced with a fluorine atom is bonded to a chiral molecular skeleton of a ferro electric liquid crystal molecule, and wherein the atom group substituted and introduced with a fluorine atom has a fluorinated phenylene ring, wherein said liquid crystal material has a uniform texture achieved by applying rectangular electric pulses while slowly cooling from an isotropic phase to a low temperature smectic A phase, followed by application of bipolar electric pulses while cooling to room temperature.

2. A liquid crystal optical device as defined in claim 1, wherein the liquid crystal material has a plurality of layer textures, and the change of the layer spacing is less than 2Å in an entire temperature range of the smectic C* phase.

3. A liquid crystal optical device as defined in claim 1, wherein the liquid crystal material forms the smectic C* phase at least within a temperature range from −5° C. to 57° C.

4. A liquid crystal optical device as defined in claim 1, wherein the layer tilt angle is more than 20° in the smectic A phase.

5. A liquid crystal optical device as claimed in claim 1, wherein said layer tilt angle is in a range of 2°–3°.

6. A liquid crystal optical device as defined in claim 1, wherein the layer texture of the liquid crystal material is a tilted bookshelf texture.

7. A liquid crystal optical device as claimed in claim 1, wherein the liquid crystal material includes 2,3-difluoro-substituted phenyl-pyrimidine.

8. A liquid crystal optical device as claimed in claim 1, wherein said rectangular electric pulses are of an amplitude of approximately 30 volts and a frequency of approximately 100 hertz and are applied while cooling from an isotropic phase to a smectic A phase.

9. A liquid crystal optical device as claimed in claim 1, wherein said bipolar electric pulses are of an amplitude of approximately 30 volts and a duration of approximately 250 microseconds and duty cycle of approximately 10 microseconds.

10. A liquid crystal optical device in which a plurality of substrates are opposed to each other at a predetermined gap with electrodes and liquid crystal alignment films being disposed, respectively, on the opposed surfaces, and a liquid crystal material is disposed in said gap, wherein said liquid crystal material has a layered structure, and the change of the layer tilt angle is greater than 0° and less than 3° in an entire temperature range of a smectic C* phase, wherein the layered tilt angle is more than 20° in the smectic A phase, wherein the electroclinic angle of the liquid crystal material is more than 5° at a smectic A phase to smectic C phase transition temperature (TAC)+0.5° K. and at an electric field of 20 V/$\mu$m, the electroclinic angle of the liquid crystal material is more than 2.5° at a smectic A phase to smectic C phase transition temperature (TAC)+2° K. and at an electric field of 20 V/$\mu$m, and an electroclinic effect is provided in a tilted smectic A phase.

* * * * *